A. F. RUTHVEN

April 11, 1933. RECIPROCATING PUMP Re. 18,791

Original Filed Feb. 12, 1927 2 Sheets-Sheet 1

Inventor:
A. F. Ruthven
By Monroe E. Miller
Attorney.

A. F. RUTHVEN
RECIPROCATING PUMP
April 11, 1933.
Re. 18,791
2 Sheets-Sheet 2
Original Filed Feb. 12, 1927
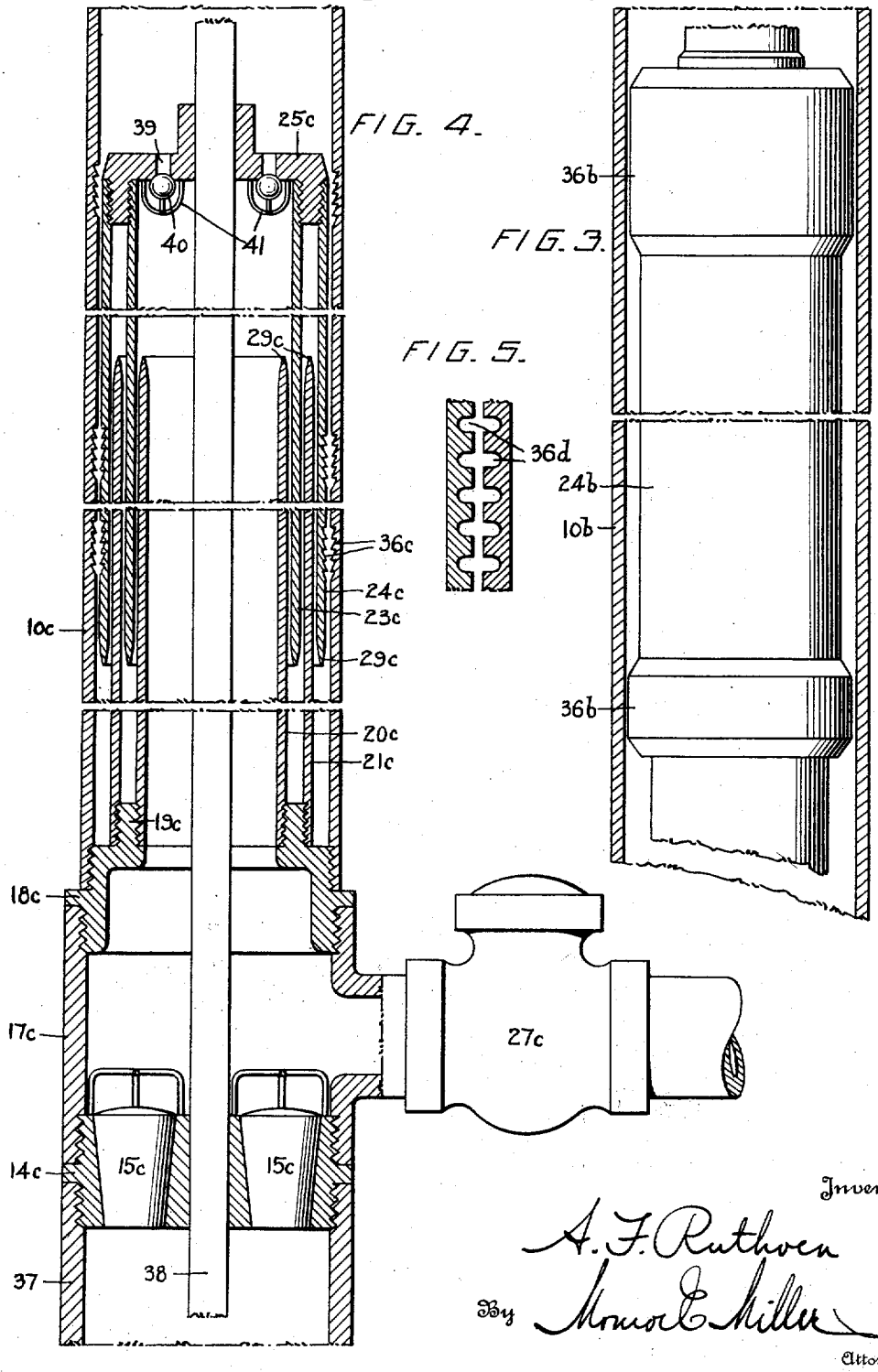
Inventor:
A. F. Ruthven
By Monroe C. Miller
Attorney.

Reissued Apr. 11, 1933 Re. 18,791

UNITED STATES PATENT OFFICE

ALBERT F. RUTHVEN, OF AMARILLO, TEXAS, ASSIGNOR TO LEATHERLESS PLUNGER PUMP CORPORATION, OF AMARILLO, TEXAS, A CORPORATION OF TEXAS

RECIPROCATING PUMP

Original No. 1,730,297, dated October 1, 1929, Serial No. 167,709, filed February 12, 1927. Application for reissue filed February 19, 1931. Serial No. 517,085.

The present invention relates to reciprocating pumps, such as are used in wells and for other purposes for pumping water, oil or other liquid, and it is an object of the invention to provide a reciprocating pump which eliminates leather and other packings, which reduces friction and wear to a minimum, and which is especially suitable for pumping water or oil containing sand.

Another object of the invention is the provision of a reciprocatory pump including a leatherless floating plunger which operates freely and with minimum friction and wear, the arrangement being such that there are films or sheets of liquid between the relatively movable parts, constituting liquid packing, and keeping the metal parts out of contact.

A further object is to provide a pump embodying telescoping tubular members or sections constituting the pump chamber, with said members out of contact with one another to provide liquid spaces between them, and the ends of such members so formed as to maintain said members concentric and out of contact when the members are moved together.

A still further object is to provide a pump of the character indicated comprising a novel assembly of the component elements whereby the pump is especially suitable for pumping water and oil from deep wells, with a minimum possibility of the pump being impaired in its operation by the presence of sand.

It is also an object of the invention to improve the pump generally in its construction and details to enhance the utility and efficiency thereof.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein—

Figure 3 is a side elevation of a modified form of plunger, showing the barrel in section;

Figure 4 is a vertical section of a force pump embodying the improvements, portions being broken away; and Figure 5 is a sectional detail illustrating a modification in the form of grooves.

Figure 1:
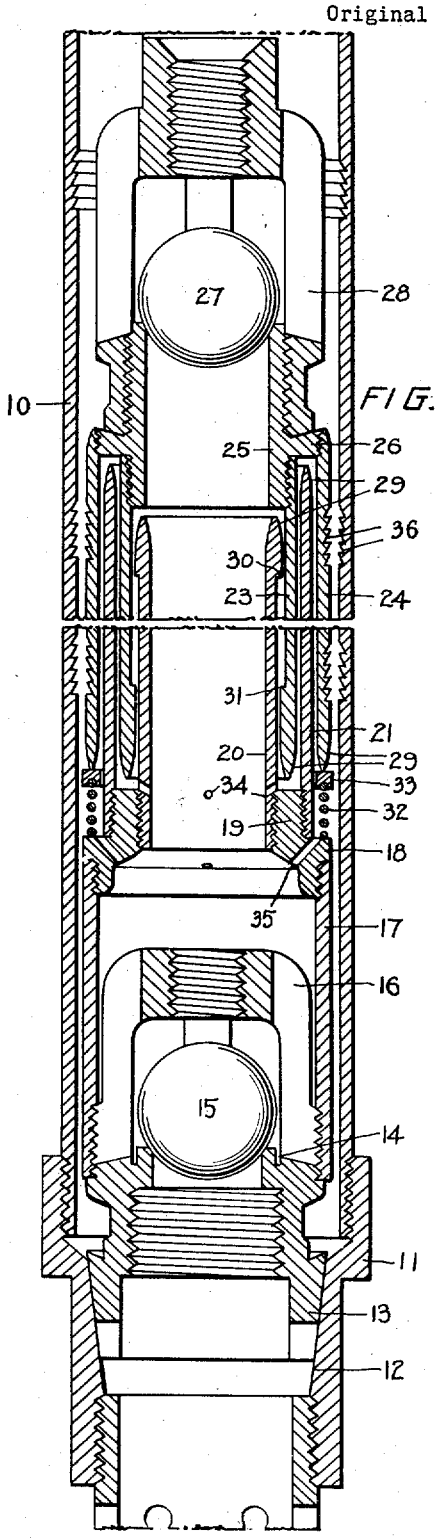
Figure 1 is a vertical section of a deep well pump embodying the improvements, portions being broken away.

Referring to Fig. 1, 10 indicates the usual pump barrel at the lower end of the well casing, and having attached to its lower end the usual liquid inlet member 11 having a tapered seat 12 therein in which is seated the lower tapered portion 13 of a valve seat 14 on which a ball 15 or other valve member is seatable to provide the lower check valve of the pump. The valve seat 14 has a cage 16 confining the ball or valve member 15 for movement therein and is adapted to be lifted through the barrel 10. A tubular member or sleeve 17 has its lower end screw-threaded or otherwise secured on the valve seat 14 and cage 16, and an annular coupling member 18 is screw-threaded or otherwise secured within the upper end of the sleeve 17 and has an upstanding annular flange 19 screw-threaded interiorly and exteriorly to receive the lower ends of upstanding pump tubes or sections 20 and 21. The pump tubes 20, 21 have a telescopic relation with depending pump tubes or sections 23, 24, so as to constitute a pump chamber that may be increased and decreased in length to produce the pumping action.

The upper end of the tube 23 is screw-threaded on a tubular valve seat 25 which has an outstanding annular flange 26 on which the upper end of the tube 24 is screw-threaded. A ball 27 or other valve member is seatable on the seat 25 to constitute an upper check valve for the pump, and a cage 28 is screw-threaded on the seat 25 over the valve member 27 and also provides means for the connection of the lower end of the pump rod (not shown). The tubes 23, 24 and upper check valve constitute the plunger of the pump which is reciprocated vertically.

The tubes 20, 21, 23, 24 are of such diameter as to provide minimum clearances between such concentric tubes, and between the outermost tube 24 and the barrel 10, so as to permit said tubes to remain out of contact and to restrict as much as possible the flow of liquid between the tubes. The tubes may be of any suitable length according to the length of pump stroke desired, and the plunger is free to float, that is, it is capable of transverse movement relatively to the tubes 20, 21, but the films or sheets of liquid between the tubes will keep them out of contact, to thereby reduce friction and wear to a minimum. The upper terminals of the tubes 20, 21 and lower terminals of the tubes 23, 24 are bevelled or tapered, both internally and externally, as at 29, in order that when the upper and lower tubes are telescoped together, said terminals of the tubes will divide the liquid which they encounter, thereby directing the liquid between the upper and lower tubes effectively and distributing the liquid to the inner and outer sides of the intermediate tubes 21, 23 in order to keep the tubes out of contact. This makes the pump free acting without the tubes contacting with one another, and the pump operates with negligible friction.

When the plunger is raised the valve member 27 is seated, so that the liquid above the plunger is lifted, and the pump chamber being enlarged will draw liquid through the inlet member 11 and past the valve member 15. The clearances between the pump tubes being small, as well as the clearance between the outermost tube 24 and barrel 10, will restrict the flow of liquid downwardly between the tube 24 and barrel 10 and between the tubes, so that during the lifting action little or no liquid will be drawn from above the plunger into the pump chamber. When the plunger is raised the spaces between the tubes 20, 21 and between the tubes 23, 24, beyond the ends of the respective tubes 23 and 21, will be enlarged, which will have a tendency to draw the liquid between the tubes, and this tendency will extend into the pump chamber as well as above the plunger, thereby creating an equalizing action, which in addition to the resistance offered to the flow of liquid between the tubes, will reduce leakage from above the plunger into the pump chamber to a minimum, especially when the plunger is reciprocated at a sufficiently high speed. The plunger may move downwardly freely, the valve member 27 opening to permit the liquid in the pump chamber to pass upwardly above said valve member. The pump therefore operates as a lift pump.

In order to lift the lower portion of the pump with the upper portion or plunger thereof, the tube 20 is formed on the exterior near its upper end with a shoulder or collar 30 and the tube 23 is formed on the interior near its lower end with a shoulder or collar 31, and the shoulder or collar 30 seating on the shoulder or collar 31 of the plunger will lift the tube 20 and other parts connected thereto so that they may be removed from the well with the plunger.

A cushion or shock absorber is preferably used to arrest the downward movement of the plunger, should same be excessive. Thus, as shown, a coiled spring 32 seats on the coupling member 18 and supports a buffer ring 33 for the contact of the lower end of the tube 24. Said tube and buffer need not contact, however, during the normal operation of the plunger, but the spring and buffer may be provided to cushion the plunger in its extreme downward movement, before the tubes contact with other metal parts beyond the ends thereof. The end of the tube 24 which contacts with the buffer 33 may be flattened slightly, if desired, for contact with said buffer.

Drain holes 34 are formed in the tube 20 immediately above the flange 19 in order that sand or other sediment dropping between the tubes 20, 21 may pass down through said holes, and drain holes 35 are also provided in the member 18 at the lower end of the tube 21 to permit sand to pass downwardly and thus avoid the accumulation of sand above said member 18.

In order to offer resistance to the downward flow of liquid between the tube 24 and barrel 10 and to also avoid interference with the operation of the plunger by sand, the exterior surface of the tube 24 and interior surface of the barrel 10 are formed with cooperating grooves 36. These grooves may be either circular or spiral like screw threads, and the grooves may be in bands or zones, as shown, or may be arranged otherwise. The grooves may also extend for any suitable distance vertically of the tube 24 and barrel. The grooves are of ratchet form with lower substantially horizontal walls and upper inclined or bevelled walls. This is for the purpose of increasing the resistance offered to the liquid flowing downwardly between the plunger and barrel, as well as aiding in the elimination of sand between the plunger and barrel. Thus, liquid flowing downwardly between the plunger and barrel encounters the lower walls of the grooves, thereby creating eddies and otherwise offering resistance to the downward flow of the liquid, so as to reduce to a minimum the flow of the liquid from above the valve member 27 into the pump chamber when the plunger is raised. However, when the plunger is moved downwardly the grooves 36 offer less resistance to the upward flow of liquid between the plunger and barrel. The grooves 36 also aid in disposing of sand which may accumulate around the plunger within the barrel, especially after the pump has been stopped for a period of time.

Thus, any sand which may have accumulated between the plunger and barrel is readily loosened, due to the presence of the grooves 36, in which the particles of sand may move, and the plunger may thus be started much more readily than with the ordinary pump plunger. The plunger is thus freed quickly even though the clearance between the plunger and barrel is small, inasmuch as the grooves 36 enable the sand to become loosened between the plunger and barrel as the plunger is started in motion. The cooperating grooves 36 of the plunger and barrel also have the action of raising the sand, due to the ratchet formations of said grooves, which aids in the upward movement of the sand but retards the downward movement thereof between the plunger and barrel. Thus, by the provision of the grooves 36 the leakage of liquid from above the plunger into the pump chamber is not only retarded, but the pump is also made more efficient in the pumping of water and oil containing sand, it being well known that the presence of sand is extremely troublesome in ordinary deep well pumps.

In some cases the inner tubes 20, 23 may be eliminated, using only the tubes 21, 24, and in other cases both the upper and lower portions of the pump may have three or more tubes, such as for a slow-acting pump.

Figure 2:
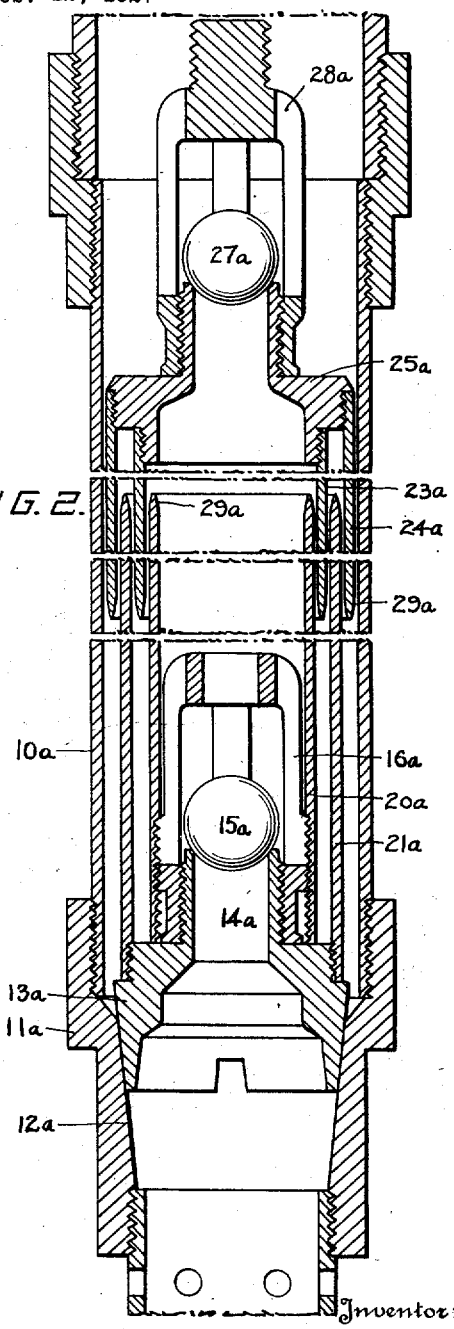
Figure 2 is a vertical section of a modified construction of deep well pump, portions being broken away.

It is also possible to use the grooves 36 in any of the confronting surfaces of the tubes, or said grooves may be omitted, as seen in Figure 2.

Figure 2 illustrates a more simple construction. The tube 20*a* is screw-threaded on the cage 16*a* of the valve ball or member 15*a*, and said cage 16*a* and tube 21*a* are screw-threaded on the seat member 14*a* which has the tapered portion 13*a* fitted in the seat 12*a* of the liquid inlet member 11*a* that is screw-threaded on the lower end of the pump barrel 10*a*. The tubes 23*a*, 24*a* are screw-threaded on the seat member 25*a* of the upper check valve which has the valve ball or member 27*a* bearing on said seat member 25*a*, and a cage 28*a* is screw-threaded on the member 25*a*. This provides a more simple assembly, and the shoulders 30, 31, spring 32 and buffer 33, apertures 34, 35 and grooves 36 are omitted.

Figure 3 illustrates a greater clearance between the outer tube 24*b* of the plunger and the barrel 10*b*, with collars 36*b* on the tube 24*b*, to offer resistance to the flow of liquid between the plunger and barrel, the edges of said collars being bevelled as shown. The collars create eddies, so as to create resistance to the flow of liquid between the plunger and barrel, and any number of collars may be used on the tube 24*b*.

Figure 4 illustrates a force pump, such as may be used at the upper end of the well casing for forcing the liquid to a higher level into a tank. This type of pump may be used for other purposes, however.

The pump barrel 10*c* has its lower end screw-threaded on a coupling member 18*c* which is screw-threaded within a tubular section 17*c* which is in turn connected by a coupling member 14*c* with the upper end of the well casing 37. The member 14*c* has openings therein around the plunger rod 38, for the upward flow of the liquid, and check valves 15*c* are seatable in said openings to prevent the downward flow of the liquid. The section 17*c* has a liquid outlet with a suitable check valve 27*c* through which the liquid is delivered to the tank or elsewhere. The member 18*c* has an upstanding annular flange 19*c* to which the lower ends of the tubes 20*c*, 21*c* are screw threaded, and the upper ends of the tubes 23*c*, 24*c* are similarly connected with a head 25*c* that is secured to the plunger rod 38, thereby reciprocating the plunger of the force pump similar to the plunger of the lift pump within the well.

When the rod 38 is raised, the column of liquid in the well casing is lifted so as to lift the liquid past the check valves 15*c* into the force pump, and when the pump rod is moved downwardly, the valves 15*c* are closed, and the liquid in the pump is forced through the valve 27*c*.

The ends of the tubes are tapered or bevelled, as at 29*c*, and, as shown, the confronting surfaces of the tube 24*c* and barrel 10*c* have the grooves 36*c* which are of ratchet form but in a position reverse to that shown in Fig. 1, to resist the upward flow of the liquid between the plunger and barrel from the pump chamber, this being a force pump.

Any liquid leaking from the pump chamber and passing above the plunger may flow down through the head 25*c* which has the apertures 39 for that purpose, with check valves 40 seating upwardly to close said apertures when the plunger moves downwardly, the valves or balls 40 being supported in cages 41 carried by the head 25*c*.

Figure 5 shows the grooves 36*d* with upper and lower square or horizontal walls so as to be effective in both the upward and downward movement of the liquid between the portions which has the grooves.

Having thus described the invention, what is claimed as new is:—

1. A pump comprising a barrel, an expansion and contraction chamber in said barrel including telescoping tubes, and means for the inlet of liquid to and the outlet thereof from said chamber, the telescoped ends of said tubes being bevelled to direct the liquid between the tubes.

2. A pump of the character described comprising a barrel, a plunger operatively mounted therein and having a passageway therethrough, and cooperating grooves formed in the opposing surfaces of the plunger and barrel to resist the flow of liquid therebetween, each of said grooves having a lower side thereof at right angles to the axis of the plunger and an upper side thereof at an acute angle to said axis.

3. A pump of the character described comprising a barrel, a plunger operatively mounted therein and having a liquid passageway therethrough for the upward movement of liquid from within the barrel, a valve for controlling said passageway, and circumferential grooves formed in opposing surfaces of the plunger and the barrel to resist the flow of liquid therebetween, each of said grooves having a lower side thereof at right angles to the axis of the plunger and an upper side thereof at an acute angle to said axis.

4. A pump of the character described comprising a barrel, a plunger operatively mounted therein and having a liquid passageway therethrough for the upward flow of liquid from within the barrel, a valve for controlling said passageway, a sleeve carried by the plunger in relatively close fitting relation to the barrel, and grooves formed in both of the opposing surfaces of the sleeve and barrel to resist the flow of liquid therebetween, each of said grooves being V-shaped in cross-section with the lower side thereof at right-angles to the axis of the plunger, and the upper side thereof at an acute angle to said axis.

5. A pump of the character described comprising a barrel, an inlet valve for the lower portion of the barrel, a plunger operatively mounted within the barrel, and having a liquid passageway therethrough for the upward flow of liquid from within the barrel, a valve for controlling said passageway, a sleeve carried by the plunger in relatively close fitting relation to the barrel, and annular grooves formed in opposing surfaces of the sleeve and barrel to resist the flow of liquid therebetween, said grooves being arranged in adjoining relation and being V-shaped in cross-section providing a serrated portion in the surface.

6. A pump of the character described comprising a barrel, an inlet valve for the lower portion of the barrel, a plunger operatively mounted within the barrel, and having a liquid passageway therethrough for the upward flow of liquid from within the barrel, a valve for controlling said passageway, a sleeve carried by the plunger in relatively close fitting relation to the barrel, annular grooves formed in opposing surfaces of the sleeve and barrel to resist the flow of liquid therebetween, each of said grooves having the lower sides thereof extending approximately at right angles to the axis of the sleeve, and having the upper side extending at an angle to said lower side and at an acute angle to the axis of the sleeve.

In testimony whereof, I hereunto affix my signature.

ALBERT F. RUTHVEN.